US005437842A

United States Patent [19]

[11] Patent Number: 5,437,842

Jensen et al.

[45] Date of Patent: Aug. 1, 1995

[54] FOAM CONTROL SYSTEM

[75] Inventors: Richard B. Jensen; H. Jeff Kronenberg, both of Caldwell, Id.

[73] Assignee: J. R. Simplot Company, Caldwell, Id.

[21] Appl. No.: 677,644

[22] Filed: Mar. 28, 1991

[51] Int. Cl.6 ........................ B05B 12/00; G05D 9/00

[52] U.S. Cl. ...................................... 422/106; 422/62; 422/105; 422/107; 422/108; 96/156; 96/176

[58] Field of Search .......................... 162/252; 55/178; 435/812; 242/307; 422/62, 105–108

[56] References Cited

U.S. PATENT DOCUMENTS 3,739,795 6/1973 Hyde et al. .......................... 55/178
4,474,680 10/1984 Kroll .................................. 252/307
4,624,745 11/1986 Sande et al. ......................... 162/252

*Primary Examiner*—James C. Housel
*Assistant Examiner*—Long V. Le
*Attorney, Agent, or Firm*—Kelly Bauersfeld & Lowry

[57] ABSTRACT

A foam control system is provided for eliminating foam in a process fluid system, such as foam generated in the course of blanching steps and the like involving processing of potatoes or other food products. The foam control system includes one or more capacitive type proximity probes for detecting the presence of foam in a corresponding number of process fluid systems or tanks, and for automatically supplying a spray of a selected defoamer agent to the tank. The defoamer agent spray is supplied to the tank for a selected time interval, with a portion of the spray being directed at the associated detector probe to insure clearing of foam from the probe.

9 Claims, 4 Drawing Sheets

FOAM CONTROL SYSTEM

BACKGROUND OF THE INVENTION

This invention relates generally to systems and methods for detecting and controlling foam generated in process fluid systems, particularly such as food processing systems and the like. More specifically, this invention relates to an improved and automated foam control system designed to effectively detect and dissipate generated foam with the use of a relatively minimum amount of a selected defoamer agent.

The generation of foam in fluid process systems is well known in connection with a wide range of manufacturing processes, wherein the presence of foam can undesirably interfere with proper and/or optimum system performance. In this regard, foams are generally characterized as a colloidal dispersion of gases within a liquid and, depending upon the process fluid contaminants, may have sufficient structure and/or volume to interfere with manufacturing processes. As one illustrative example, starch-based products such as potatoes are particularly susceptible to the generation of foam during process steps such as blanching, cutting, etc.

In the past, foams generated in process fluid systems have been dissipated by the addition of liquid defoamer agents to the associated process fluid tank or stream. Most commonly, these defoamer agents are added manually by line personnel in response to visual detection of foam, and in an amount selected according to the background and experience of the individuals involved. Unfortunately, defoamer agents tend to be relatively costly and are normally used in significant excessive amounts when added manually to the process fluid.

In some cases, electronic foam sensor devices have been proposed for use in electronically detecting the presence of foam and for responding automatically to add the defoamer agent to the process system. However, such automated systems have typically added the defoamer agent until the foam is no longer detected by the sensor device, resulting once again in excessive addition of the costly defoamer agent. Moreover, no effective method has been provided for preventing foam residue build-up on the sensor device, with the undesirable result that false foam readings are frequently encountered.

There exists, therefore, a significant need for an improved and highly effective foam control system for automatically adding defoamer agent to a process fluid in response to foam detection, wherein excessive defoamer agent quantities and false foam readings are substantially avoided. The present invention fulfills all of these needs and provides further related advantages.

SUMMARY OF THE INVENTION

In accordance with the invention, an improved foam control system includes a detector probe adapted to detect the presence of foam in a fluid process tank or production line or the like, and for signalling a control unit to automatically deliver a selected quantity of a defoamer agent to the process fluid for foam dissipation. The defoamer agent is delivered in the preferred form through one or more spray nozzles, with a portion of the defoamer spray contacting the detector probe to clear foam therefrom.

In the preferred form of the invention, the detector probe comprises a capacitive type proximity probe positioned at an adjustable height near the surface of a process fluid within a fluid tank or flow stream. Upon detection of foam, the detector probe activates a pump and operates appropriate valves to deliver the defoamer agent to a water line at a predetermined mixing ratio, and to deliver the mixed defoamer agent and water flow to the process fluid. The control unit continues the application of the defoamer agent for a preselected time interval. At least one spray nozzle aims a liquid spray onto the detector probe to clear foam and related residue therefrom, wherein this spray may comprise mixed water and defoamer agent, or water alone.

In accordance with other preferred aspects of the invention, the control unit can be adapted to activate an alarm such as audio and/or visual alarm devices in the event that uninterrupted applications of defoamer agent are required over a selected time span and are unsuccessful in resolving process fluid foaming.

DETAILED DESCRIPTION OF THE PREFERRED EMBODIMENTS

Figure 1:
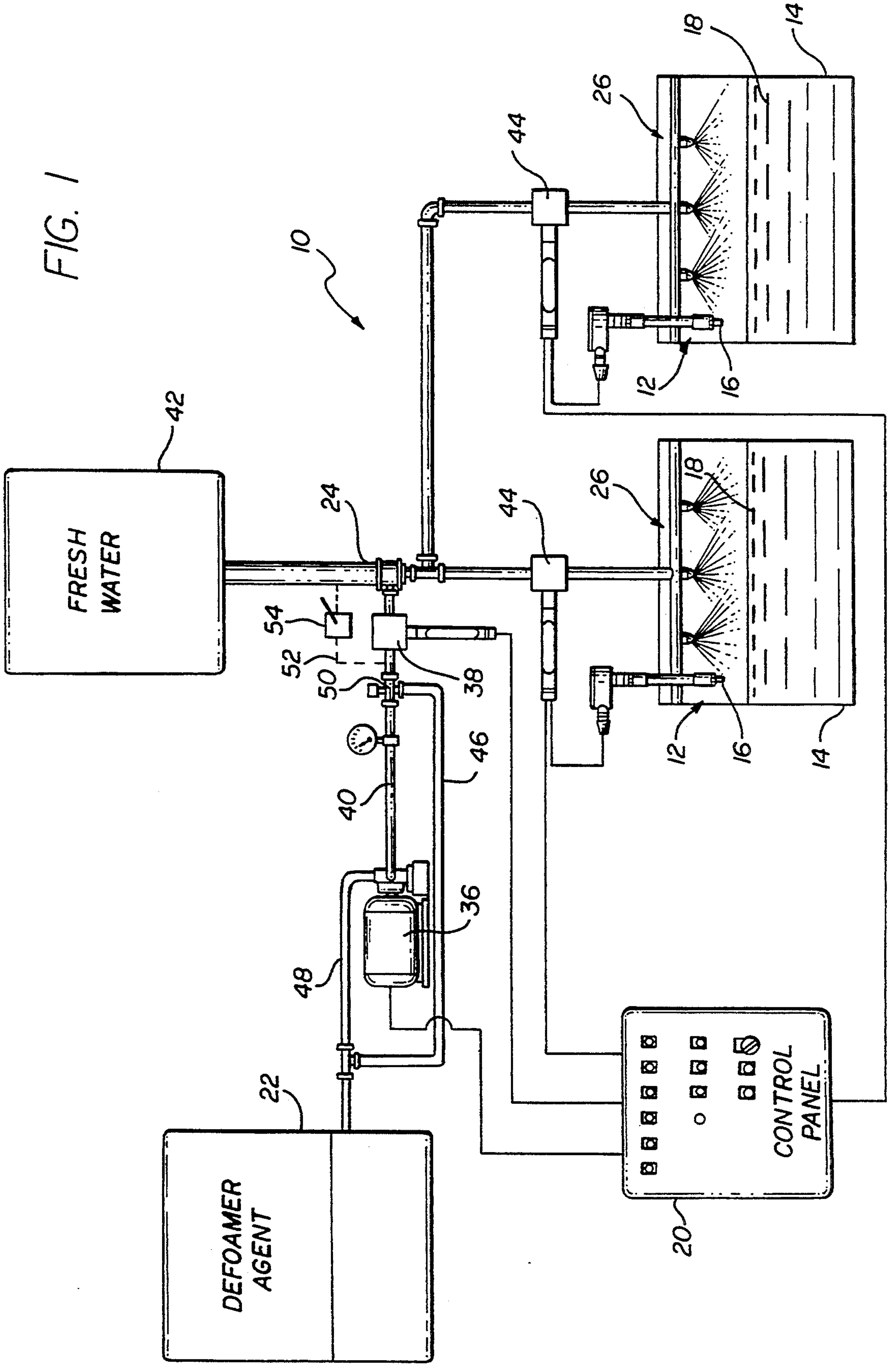
FIG. 1 is a schematic diagram illustrating one preferred form of a foam control system embodying the novel features of the invention.

As shown in the exemplary drawings, an improved foam control system referred to generally in FIG. 1 by the reference numeral 10 is provided for use in detecting and dissipating foam generated in process fluid production systems, particularly such as process fluid tanks and/or flow streams utilized in processing of food products such as potatoes and the like. The foam control system monitors the process fluid for the presence of foam, and in response to foam detection automatically delivers a selected defoamer agent to the process fluid.

The foam control system 10 of the present invention is designed for reliable, automated operation to detect and control generated foam without requiring use of excessive quantities of costly defoamer agent. The improved foam control system is particularly designed for use in process fluid systems for handling potatoes or similar food products wherein excessive quantities of starch-based foams can be present on the surface of water blanching medium or at other stages in a potato process line, such as product cutting. However, it will be understood that the invention is applicable to process fluid systems in general wherein foam generation occurs and requires periodic dissipation for proper process fluid control.

As shown generally in FIG. 1, the foam control system 10 includes one or more detector probes 12 associated respectively with a corresponding number of process fluid tanks 14, which represent different stages of a process fluid production system and/or similar stages of parallel production line processes in a processing facility. Each detector probe 12 includes an active detector element 16 located in spaced relation above an associated process fluid 18 with the underlying tank 14, so that build-up of foam on the surface of the fluid 18 will thus be detected by the probe 12. Upon such detection of foam, the probe 12 signals a control unit 20 to deliver a selected defoamer agent 22 in proportional quantity to a water line 24, thereby generating a mixed stream of defoamer agent and water which is delivered to the process fluid tank 14 via a bank of overlying spray nozzles 26. In accordance with one primary aspect of the invention, one of the spray nozzles 26 aims a portion of the mixed spray to contact the active detector element 16 of the probe 12 to insure clearing of foam therefrom and to prevent build-up of foam residue thereon. Alternately, if desired, the mixed defoamer agent and water may be supplied to the process fluid without spraying, in which case a small water spray or mixed defoamer agent and water spray contacts the probe 12 to clear foam therefrom.

Figure 2:
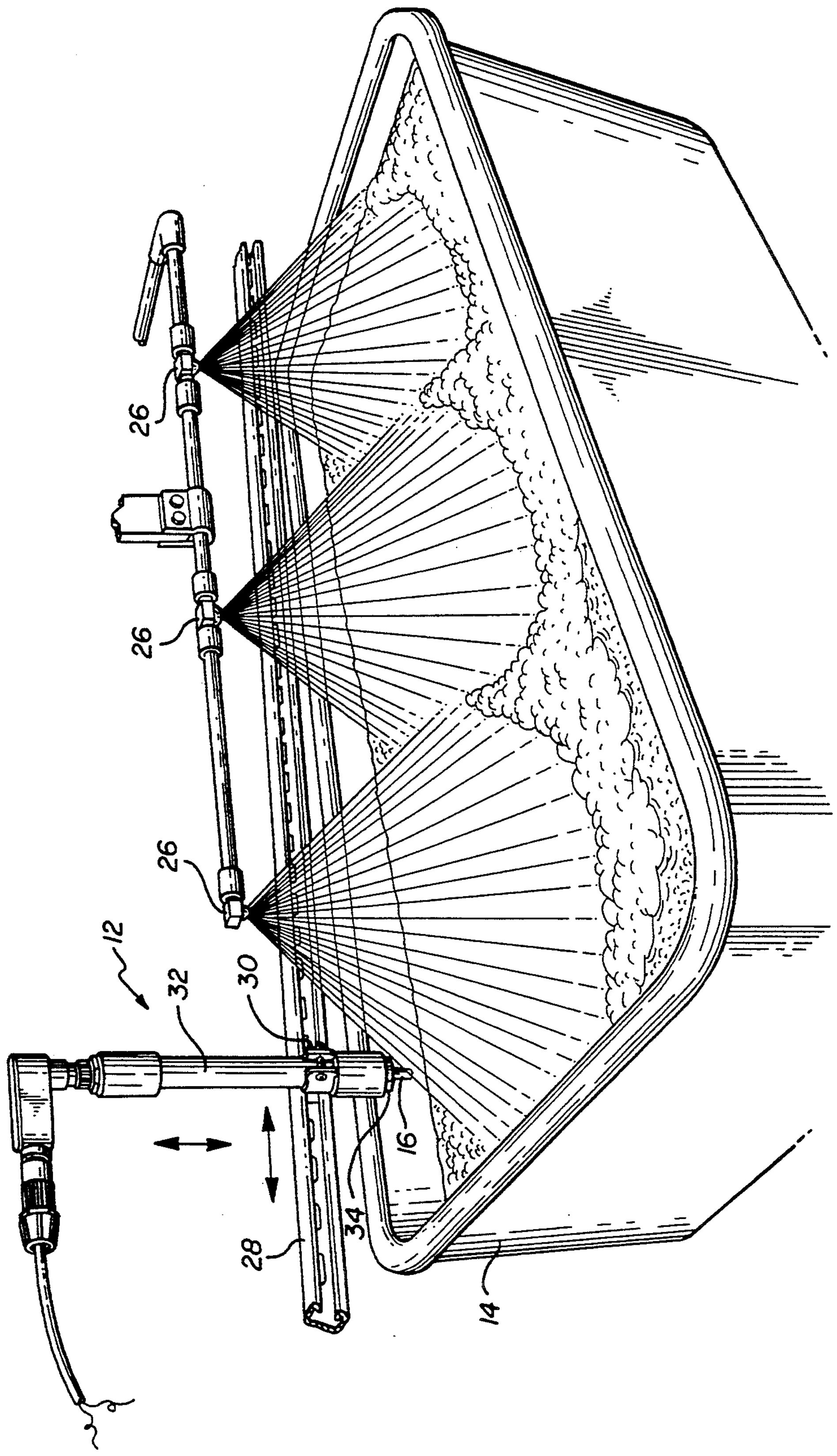
FIG. 2 is a fragmented perspective view depicting a foam detector probe in association with a process fluid tank and defoamer agent spray nozzles, in accordance with the system of FIG. 1.

More specifically, as shown in more detail in FIG. 2 the illustrative tank 14 having the process fluid 18 therein is shown in association with an elongated mounting rack 28 extending along one side thereof. A clamp 30 on the rack 28 provides means for adjustably mounting the probe 12 at a selected longitudinal and vertical position relative to the process fluid 18. In a typical process fluid system, the probe 12 will be located at a position most likely to collect generated foam, such as at a relative downstream end of the tank 14.

The detector probe 12 comprises, in a preferred form, a tubular housing 32 of a selected material compatible for use in the process fluid environment. For example, in process systems for food products such as potatoes, the housing may conveniently comprises a short length of plastic tubing of polyvinyl chloride (PVC) or the like, with a threaded end plug 34 at the lower end thereof supporting the downwardly protruding active detector element 16. One preferred type of detector element 16 comprises a proximity sensor of the capacitive type, such as the capacitive proximity sensors marketed by Omron Electronics, Inc. of Schaumberg, Ill. under model designations E2K-C25M or E2K-X4M. Such capacitive type proximity sensors function when placed in contact or in close proximity with generated foam to act as a switch and thereby permit an electrical signal indicative of foam detection to be sent to the control unit 20.

Figure 3:
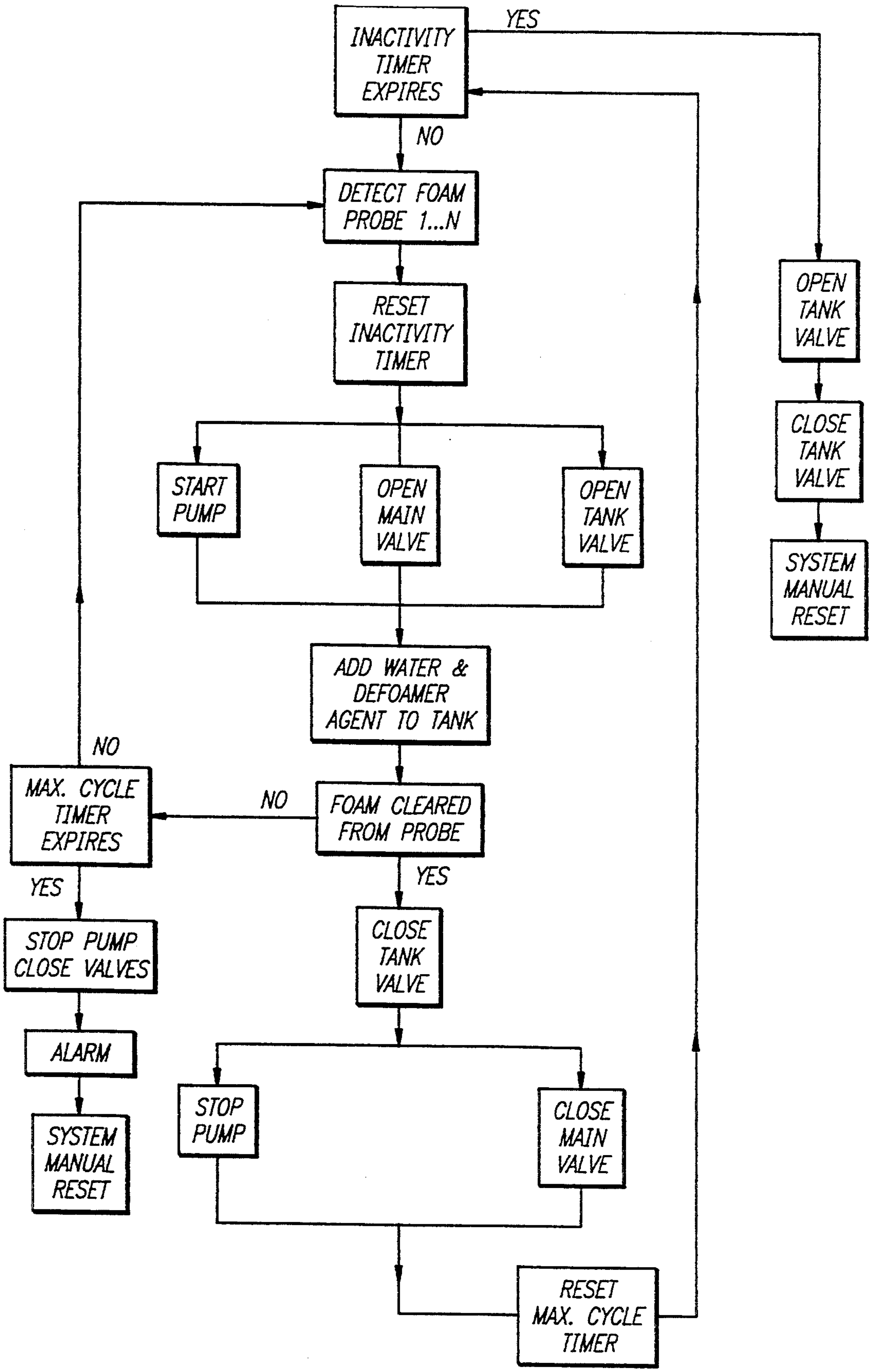
FIG. 3 is a flow chart representing operation of a control unit to control the foam control system of FIG. 1.

As shown in FIG. 1 and with simultaneous reference to the flow chart diagram of FIG. 3, the control unit 20 responds to an input signal indicative of foam detection by one of the probes 12 associated therewith to start a pump 36 associated with the supply of defoamer agent 22 and to open a main solenoid operated control valve 38 along a pump discharge line 40, such that the pump 36 delivers the defoamer agent to the water line 24. In this regard, the defoamer agent 22 is provided in liquid form and comprises a selected agent known in the art for use in dissipating and regulating foam in the specific type of process system associated therewith. The pump 36 preferably comprises a positive displacement pump to insure accurate and proportional defoamer agent delivery to the water line 24, which may comprise a pressurized fresh water line connected to the normal facility water source or supply 42. When the main control valve 38 is opened, a solenoid operated tank control valve 44 associated with the detected foam is substantially simultaneously opened to permit the mixed defoamer agent and water to be applied to the surface of the process fluid 18 in the tank 14 via the bank of spray nozzles 26.

The supply of the defoamer agent 22 and water to the process tank 14 continues for a predetermined and relatively short time period, such as an interval of about ten seconds, resulting in the addition of a prescribed quantity of the defoamer agent to the tank. In this regard, this interval is chosen to be short in time to prevent over addition of the defoamer agent, while delivering an empirically determined quantity sufficient in normal operation to knock down and effectively dissipate the generated foam. At the same time, one of the spray nozzles 26 overlaps a portion of its spray to strike the detector probe 12 for purposes of washing any foam and foam residue from the active element 16, at the end of the set time period for foam addition. The control unit 20 closes the tank valve 44 and then closes the main valve 38 and deactivates the pump 36 to reset the system.

A feedback line 46 is conveniently provided between the intake conduit 48 and the discharge conduit 40 of the pump 36 to accommodate brief intervals when the pump 36 is operational but the main or tank valves 38 and 44 are not open. The feedback line 46 recirculates the defoamer agent when the pressure within the discharge line 40 exceeds a selected threshold value. A pressure switch 50 along the discharge line 40 redirects the defoamer agent to the feedback line 46 for recirculation to the intake conduit 48 at a location upstream from the pump 36.

In addition, in the event of malfunction of the main control valve 38, a bypass line 52 with a manually operated valve 54 is provided to supply the defoamer agent to the water line 24. Accordingly, if the main control valve malfunctions, the production process need not be immediately shut down. Instead, production may proceed with continued supply of the defoamer agent as required and in accordance with operation of the pump 36. Similarly bypass lines equipped with manually operated valves may also be provided for each of the tank valves 44.

According to further aspects of the invention, the control unit 20 may be programmed to monitor and respond to excessive generation of foam, or to the absence of foam generation for extended time periods. For example, with reference to FIG. 3, at the conclusion of each addition of the defoamer agent, the continued presence of foam by the probe 12 will cause the system to recycle for the addition of more defoamer agent to the process fluid. However, if the probe continues to detect foam for an extended time period of perhaps thirty minutes, a maximum cycle timer expires and causes the control unit 20 to stop the pump 36 and close the control valves, and simultaneously to activate audio and/or visual alarms. Alternately, if desired, expiration of the maximum cycle time may result in alarm activation only, or result in alarm activation at one time interval followed by system shutdown at the end of a subsequent time interval.

In another control mode, the control unit 20 includes an inactivity timer which monitors and responds to inoperation of the foam control system. That is, the inactivity timer is normally reset each time foam is detected by one of the probes 12. If no foam is detected for an extended time period of perhaps one hour, the inactivity time expires and causes the control unit to open the tank control valves 44 for water flush. This step thus conveniently controls conditions representing process line shutdown to flush residual defoamer agent from the system and thereby prevent the agent from hardening within or otherwise obstructing the flow lines.

Figure 4:
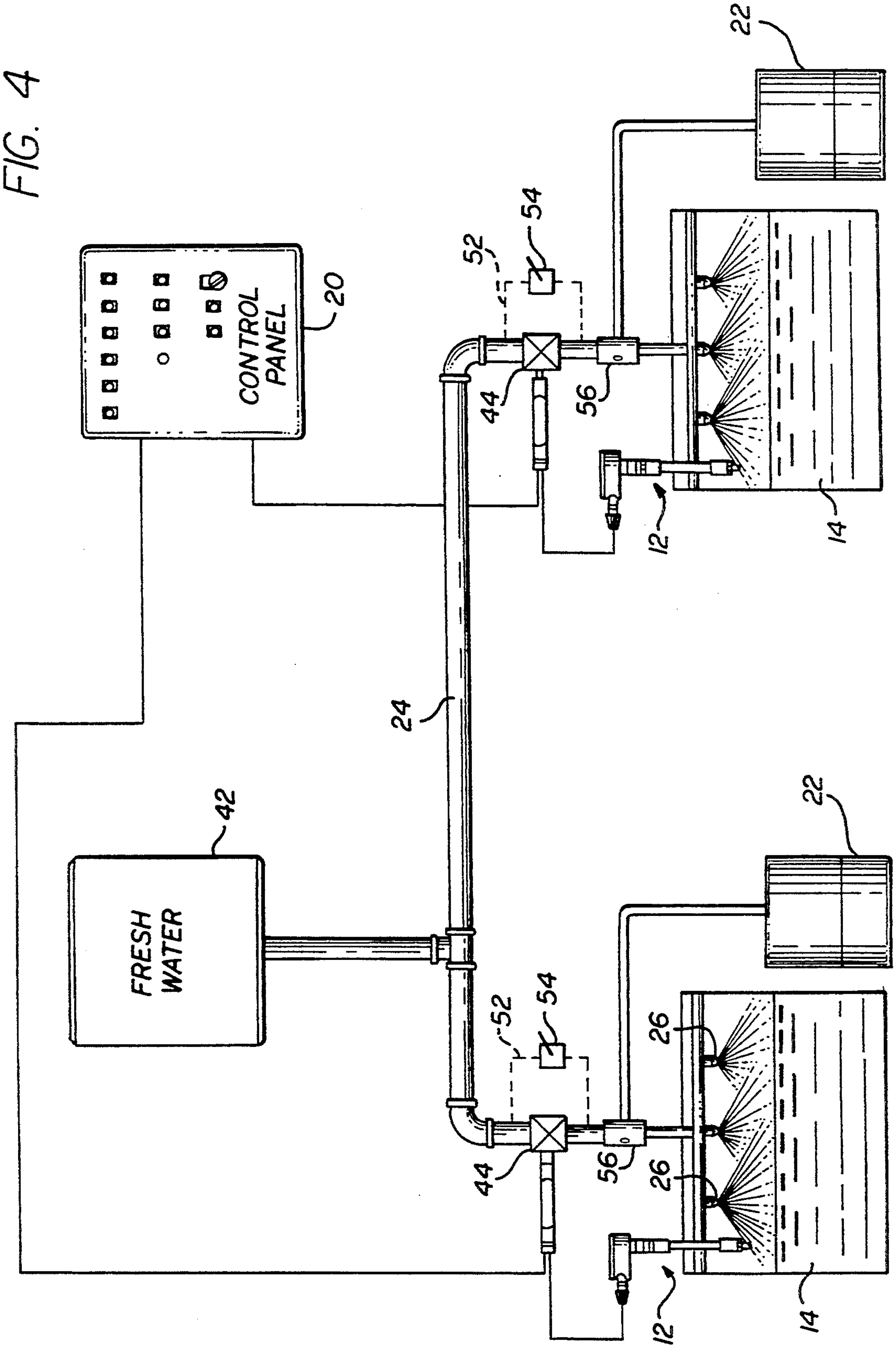
FIG. 4 is a schematic diagram illustrating an alternative preferred form of the foam control system.

FIG. 4 shows an alternative preferred system arrangement wherein components common to FIGS. 1-3 are identified by common reference numerals. As shown in FIG. 4, a main water line 24 supplies water from a source 42 to each of a plurality of process fluid tanks 14. Detector probes 12 associated with each of the tanks 14 sense the presence of foam and signal a control unit 20 to open a tank control valve 44 associated therewith. When the tank control valve 44 is opened, water flow through an injector 56 draws defoamer agent 22 by venturi action for flow to a bank of nozzles 26 for spraying the mixed water and defoamer agent onto the process fluid. Once again, a portion of the spray is directed to contact the probe 12 to clear foam therefrom. Bypass lines 52 with manual bypass valve 54 can be provided with each control valve 44, if desired.

The foam control system of the present invention thus provides a relatively simple and cost-efficient yet highly effective automated arrangement for detecting and dissipating foam in process fluid production lines. The system adds defoamer agent in a quantity chosen by setting system flow rates and timed agent addition cycles tailored to the process fluid system, and tailored to prevent excessive use of defoamer agent. The spraying of liquid such as the mixed defoamer agent and water onto the detector probe clears the probe of any foam and further prevents residue build-up on the probe.

A variety of further modifications and improvements to the foam control system of the present invention will be apparent to those skilled in the art. Accordingly, no limitation on the invention is intended by way of the foregoing description and accompanying drawings, except as set forth in the appended claims.

What is claimed is:

1. A foam control system for detecting and dissipating foam generated at the surface of a process liquid, said system comprising:

a foam detector probe mounted in close proximity with and a short distance above the surface of a process liquid, said probe including means for detecting foam at the surface of the process liquid and for generating a signal in response thereto;

a control unit; and defoamer agent supply means for supplying a defoamer agent to the process liquid to dissipate the detected foam, said control unit including means responsive to said signal generated by said probe to operate said supply means to supply a predetermined incremental dose of the defoamer agent to the process liquid, said dose being independent of the quantity of foam on the surface of the process liquid.

2. The foam control system of claim 1 further including means for rinsing foam residue from said probe at the time of supplying the defoamer agent to the process liquid.

3. The foam control system of claim 1 wherein said means responsive to said signal generated by said probe operates said supply means for a preselected time interval to supply the predetermined dose of the defoamer agent to the process liquid.

4. The foam control system of claim 1 wherein said defoamer agent supply means includes means for spraying the defoamer agent onto the detected foam to dissipate the foam.

5. The foam control system of claim 1 wherein said defoamer agent supply means includes for spraying a proportioned mixture of the defoamer agent and water onto the detected foam to dissipate the foam.

6. The foam control system of claim 5 wherein said probe is mounted in relation to the process liquid to be contacted by the proportioned mixture of the defoamer agent and water when sprayed onto the detected foam, to rinse foam residue from said probe.

7. The foam control system of claim 1 wherein said probe comprises a capacitive type proximity sensor.

8. The foam control system of claim 1 wherein said defoamer agent supply means comprises a defoamer agent reservoir, and a pump having an intake line connected to said reservoir, said pump further including a discharge line, said means responsive to said signal generated by said probe comprising a main control valve connected along said discharge line.

9. The foam control system of claim 8 further including a feedback line for recirculating defoamer agent from said discharge line to said intake line, and pressure responsive means for recirculating the defoamer agent through said feedback line when the pressure along said discharge line reaches a predetermined level.

* * * * *